US012622362B2

(12) United States Patent
Roberge et al.

(10) Patent No.: US 12,622,362 B2
(45) Date of Patent: May 12, 2026

(54) AGRICULTURAL SYSTEM HAVING AN ACCUMULATOR

(71) Applicant: CNH Industrial America LLC, New Holland, PA (US)

(72) Inventors: Martin J. Roberge, Saskatoon (CA); Jonathan E. Ricketts, Davenport, IA (US); Jason D.M. Cousins, Saskatoon (CA)

(73) Assignee: CNH Industrial America LLC, New Holland, PA (US)

( * ) Notice: Subject to any disclaimer, the term of this patent is extended or adjusted under 35 U.S.C. 154(b) by 623 days.

(21) Appl. No.: 17/799,178

(22) PCT Filed: Feb. 10, 2021

(86) PCT No.: PCT/US2021/017459
§ 371 (c)(1),
(2) Date: Aug. 11, 2022

(87) PCT Pub. No.: WO2021/163195
PCT Pub. Date: Aug. 19, 2021

(65) Prior Publication Data
US 2023/0069948 A1 Mar. 9, 2023

Related U.S. Application Data

(60) Provisional application No. 62/975,588, filed on Feb. 12, 2020.

(51) Int. Cl.
*A01F 15/08* (2006.01)
*A01F 15/10* (2006.01)
*A01F 15/18* (2006.01)

(52) U.S. Cl.
CPC ...... *A01F 15/0883* (2013.01); *A01F 15/0833* (2013.01); *A01F 15/106* (2013.01); *A01F 15/18* (2013.01)

(58) Field of Classification Search
CPC .............. A01F 15/0883; A01F 15/0833; A01F 15/106; A01F 15/18; A01F 15/10; A01F 15/08
See application file for complete search history.

(56) References Cited

U.S. PATENT DOCUMENTS

| | | | |
|---|---|---|---|
| 3,005,400 A | | 10/1961 | Bornzin |
| 4,514,969 A | * | 5/1985 | Moosbrucker ...... A01F 15/0705 |
| | | | 100/88 |

(Continued)

FOREIGN PATENT DOCUMENTS

| | | |
|---|---|---|
| CN | 206851401 U | 1/2018 |
| CN | 110199691 | 9/2019 |

(Continued)

OTHER PUBLICATIONS

International Search Report and Written Opinion for PCT Application No. PCT/US2021/017459 dated Feb. 10, 2021 (9 pages).

(Continued)

*Primary Examiner* — Arpad Fabian-Kovacs
(74) *Attorney, Agent, or Firm* — Fletcher Yoder, P.C.

(57) ABSTRACT

An agricultural system includes a baling system configured to form a bale of crop material and an accumulator positioned laterally outward from the baling system. The accumulator is adjustable between an open position and a closed position, and the baling system is configured to receive the crop material from the accumulator.

20 Claims, 10 Drawing Sheets

(56) References Cited

U.S. PATENT DOCUMENTS

| | | | | |
|---|---|---|---|---|
| 4,914,900 | A * | 4/1990 | Viaud | A01F 15/0705 |
| | | | | 100/88 |
| 6,032,446 | A * | 3/2000 | Gola | A01F 15/00 |
| | | | | 100/88 |
| 6,263,650 | B1 * | 7/2001 | Deutsch | A01D 46/082 |
| | | | | 56/16.4 B |
| 6,421,992 | B1 | 7/2002 | Goering et al. | |
| 6,421,996 | B1 * | 7/2002 | Deutsch | A01D 46/084 |
| | | | | 100/88 |
| 6,938,401 | B2 * | 9/2005 | Bares | A01D 46/08 |
| | | | | 56/13.1 |
| 6,941,740 | B2 * | 9/2005 | Fox | A01F 15/07 |
| | | | | 100/88 |
| 8,910,460 | B2 * | 12/2014 | Horstmann | A01F 15/0705 |
| | | | | 100/88 |
| 8,991,308 | B2 | 3/2015 | Roberge et al. | |
| 9,253,947 | B2 | 2/2016 | Hornung | |
| 9,301,448 | B2 | 4/2016 | Ramaekers | |
| 9,681,605 | B2 * | 6/2017 | Noonan | A01D 61/02 |
| 9,877,432 | B2 | 1/2018 | Smith | |
| 11,382,275 | B2 * | 7/2022 | Frey | A01F 15/0833 |
| 2010/0267432 | A1 | 10/2010 | Roberge et al. | |
| 2013/0291507 | A1 * | 11/2013 | Williams | A01D 46/08 |
| | | | | 56/13.5 |
| 2014/0237981 | A1 | 8/2014 | Roberge | |
| 2016/0120126 | A1 * | 5/2016 | Weber | A01D 46/084 |
| | | | | 56/16.4 B |
| 2016/0353664 | A1 * | 12/2016 | Weber | A01F 15/18 |
| 2017/0202149 | A1 | 7/2017 | Smith | |

FOREIGN PATENT DOCUMENTS

| | | |
|---|---|---|
| EP | 2959767 | 12/2015 |
| GB | 2324498 A | 10/1998 |
| WO | 2019/166842 A1 | 9/2019 |

OTHER PUBLICATIONS

Screen capture from YouTube video Clip entitled "John Deere CP690 Cotton Picker in Action - Seminole County Georgia", uploaded on Oct. 3, 2017 by Machinery Pete, retrieved from the internet: https://www.youtube.com/ watch?v=uolj0awFXRQ.

Screen capture from YouTube video Clip entitled "Funcionamento da colhedora de algodão John Deere", uploaded on Feb. 25, 2015 by John Deere Brasil, retrieved from the internet: https://www.youtube.com/watch? V=KXNY6D2sVAQ.

Screen capture from YouTube video Clip entitled "John Deere GoCotton: CP690 Cleaning in Transport Configuration", uploaded on Aug. 6, 2014, by John Deere, retrieved from the internet: https://www.youtube.com/watch? v=FXzSuJQtdak&t=64s.

CN Application No. 202180014326.8, Office Action dated Aug. 11, 2023, 18 pgs.

* cited by examiner

CONTROL SYSTEM

M   P

AGRICULTURAL SYSTEM HAVING AN ACCUMULATOR

BACKGROUND

The disclosure relates generally to a crop harvesting and baling agricultural system.

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be understood that these statements are to be read in this light, and not as admissions of prior art.

An agricultural system may harvest crops (e.g., cotton) from an agricultural field. For example, the agricultural system may include features that remove the crops from the agricultural field and transport the crops into a baling system within the agricultural system. The baling system compacts the received crop into a desirable shape (e.g., to form a bale or module). The agricultural system may then deposit the compacted crop onto the agricultural field for later collection, thereby enabling the crops to be collected. Unfortunately, it may be difficult for certain agricultural systems to perform the processes of removing the crops from the agricultural field while depositing the crops onto the agricultural field. For example, the agricultural system may stop movement and suspend operation of removing additional crops while preparing to deposit the already removed crops, thereby delaying the harvesting operation.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, an agricultural system includes a baling system configured to form a bale of crop material and an accumulator positioned laterally outward from the baling system. The accumulator is adjustable between an open position and a closed position, and the baling system is configured to receive the crop material from the accumulator.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
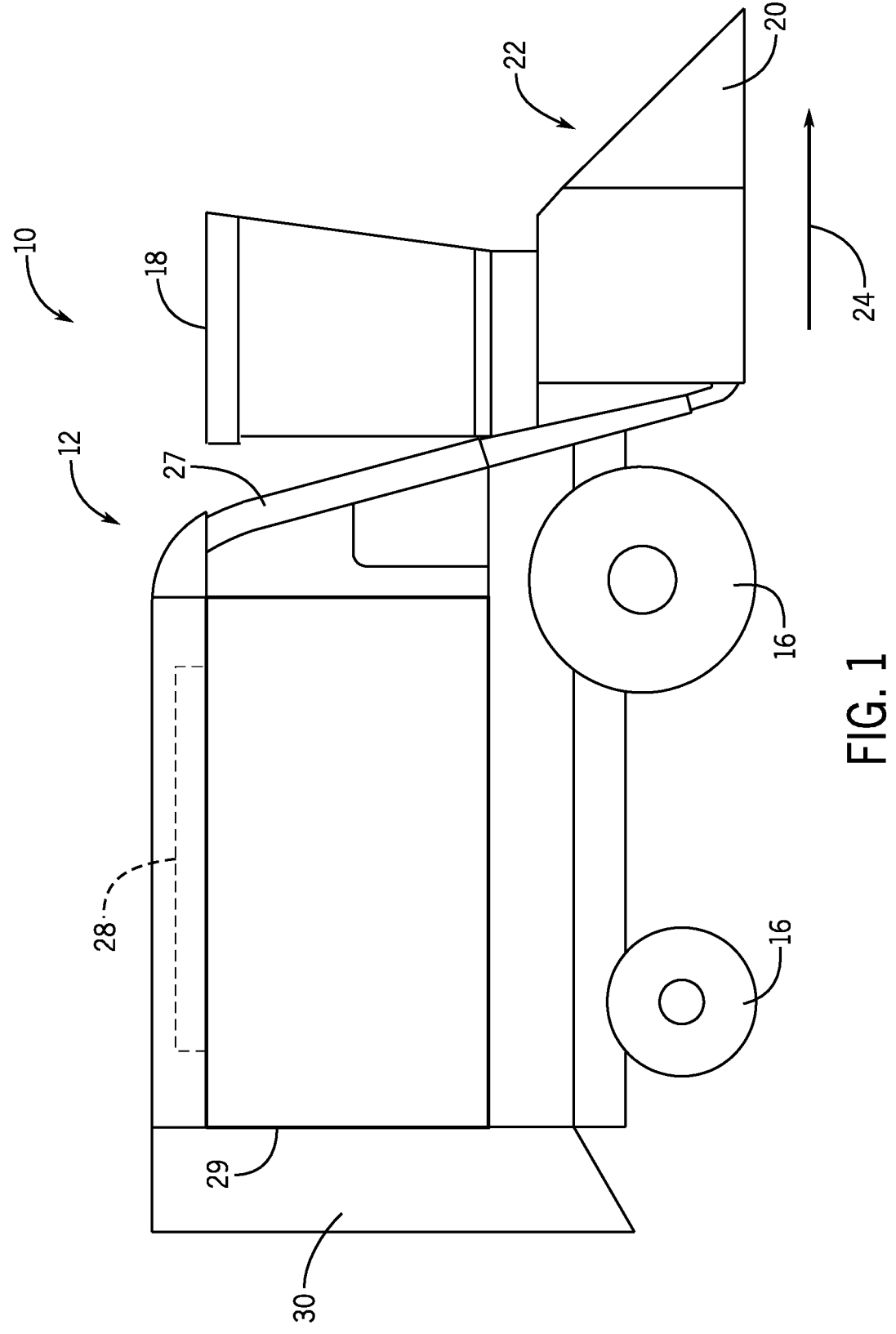
FIG. 1 is a side view of an embodiment of an agricultural system configured to harvest crop material, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate to an agricultural system (e.g., a cotton picker) that gathers crop material from an agricultural field, compacts the crop material into a bale or module (e.g., cotton module), and deposits the bale in the agricultural field. By forming the crop material into the bale, the agricultural system enables the crop material to be collected at a later time. For example, the crop material may retain its shape within each formed bale, and multiple bales of crop material may be picked up during a subsequent collection operation.

In conventional agricultural system, it may be difficult for the agricultural system to perform multiple operations concurrently. For instance, while the agricultural system is preparing to deposit a bale of crop material onto the agricultural field, such as by wrapping the bale so as to maintain the shape of the bale, the agricultural system may not be able to gather additional crop material from the agricultural field. For example, there may be limited space within an interior of the agricultural system to hold additionally received crop material while the gathered crop material is being prepared for deposition. As such, the agricultural system may pause the operation of gathering additional crop material until the bale has been deposited onto the agricultural field. However, pausing the operation of gathering crop material reduces an efficiency of the harvesting/baling operation.

Thus, an agricultural system configured to concurrently perform the processes of gathering crop material and depositing crop material onto the agricultural field may increase the efficiency of the harvesting/baling operation. In the embodiments disclosed herein, the agricultural system includes an accumulating system configured to store crop material removed from the agricultural field. The agricultural system may also include a baling system configured to compact crop material and deposit the compacted crop material onto the agricultural field. While the agricultural system is preparing a first collection of crop material for deposition onto the agricultural field via the baling system, the agricultural system may continue to gather a second collection of crop material from the agricultural field and store the second collection of crop material in the accumulating system. After the first collection of crop material has been deposited onto the agricultural field, the agricultural system may then move the second collection of crop material from the accumulating system to the baling system. The baling system, in turn, compacts the second collection of crop material and prepares the second collection of crop material for deposition onto the agricultural field. In this way, the agricultural system may prepare crop material for deposition onto the agricultural field without pausing the operation of gathering the crop material from the agricultural field, thereby increasing the efficiency of the harvesting/baling operation.

With the preceding in mind, FIG. 1 is a side view of an embodiment of an agricultural system 10 configured to harvest crop material. In the illustrated embodiment, the agricultural system 10 includes an agricultural baling system 12 and wheels 16 that enable the agricultural system 10 to move across an agricultural field and drive movement of the agricultural system 10. The agricultural system 10 also has a cab 18 in which an operator may be located. The operator may drive the agricultural system 10 via controls within the cab 18 to control movement of the agricultural system 10 across the agricultural field. Additionally or alternatively, the agricultural system may be automatically (e.g., autonomously) controlled and operated. The agricultural system 10 includes a crop collector 20 (e.g., header) mounted on a front end 22 of the agricultural system 10. As the agricultural system 10 moves in a forward direction 24, the crop collector 20 may cut crops and gather crop material, such as cotton, from the cut crops. For example, the crop collector 20 may have multiple rotating drums that are configured separate crop material (e.g., cotton) from residue. In some embodiments, the agricultural system 10 includes a conveying system 27 (e.g., an air assisted conveying system) that directs the crop material (e.g., harvested cotton) from the crop collector 20 to the agricultural baling system 12 (e.g., into a baling chamber). For instance, the conveying system 27 may direct the crop material to an accumulator 29, and the accumulator 29 may be configured to operate in a pass-through mode to direct the crop material to the agricultural baling system 12. The accumulator 29 may also be configured to operate in a storage mode, in which crop material is stored within the accumulator 29 and is blocked from being directed to the agricultural baling system 12. In additional or alternative embodiments, the agricultural system may include another suitable system to transport the crop material from the crop collector to the accumulator and/or agricultural baling system. The agricultural baling system 12 compacts the crop material and forms crop material into a bale 28.

In some embodiments, the agricultural baling system 12 includes a rear gate 30 configured to release the bale 28 from the agricultural baling system 12. The rear gate 30 is configured to move between the illustrated closed position and an open position (e.g., via a hydraulic system, a pulley system, an electromechanical system, etc.). In the closed position, the rear gate 30 may block movement of the bale 28 from the agricultural baling system 12. In an open position, the rear gate 30 may expose the bale to an ambient environment, thereby enabling the bale 28 to be ejected from the agricultural baling system 12. In an example, the agricultural baling system 12 may include a driving mechanism configured to impart a force onto the bale 28 to move the bale 28 out of the opened rear gate 30. In another example, the agricultural baling system may be tilted, and a gravitational force may drive the bale to move through the opened rear gate. The agricultural system may also include a ramp configured to direct the bale toward the surface of the agricultural field as the bale is ejected. For example, the rear gate 30 may contact the surface of the agricultural field to enable the bale 28 to translate (e.g., slide) along the rear gate 30 and be deposited onto the agricultural field.

Although the illustrated agricultural system 10 is self-propelled, in additional or alternative embodiments, the agricultural system may be towed by a work vehicle, such as a tractor. For example, the tractor may tow the agricultural system and guide the agricultural system through the agricultural field to gather crop material. To this end, the agricultural system and the tractor may be removably coupled to one another, such as via a hitch assembly. Furthermore, the agricultural system may alternatively collect crop material deposited on a surface of the field, as compared to separating the crop material from the crops. In other words, the crop material may have been previously left in an agricultural field. In a subsequent operation, the agricultural system may collect and compact the crop material.

Figure 2:
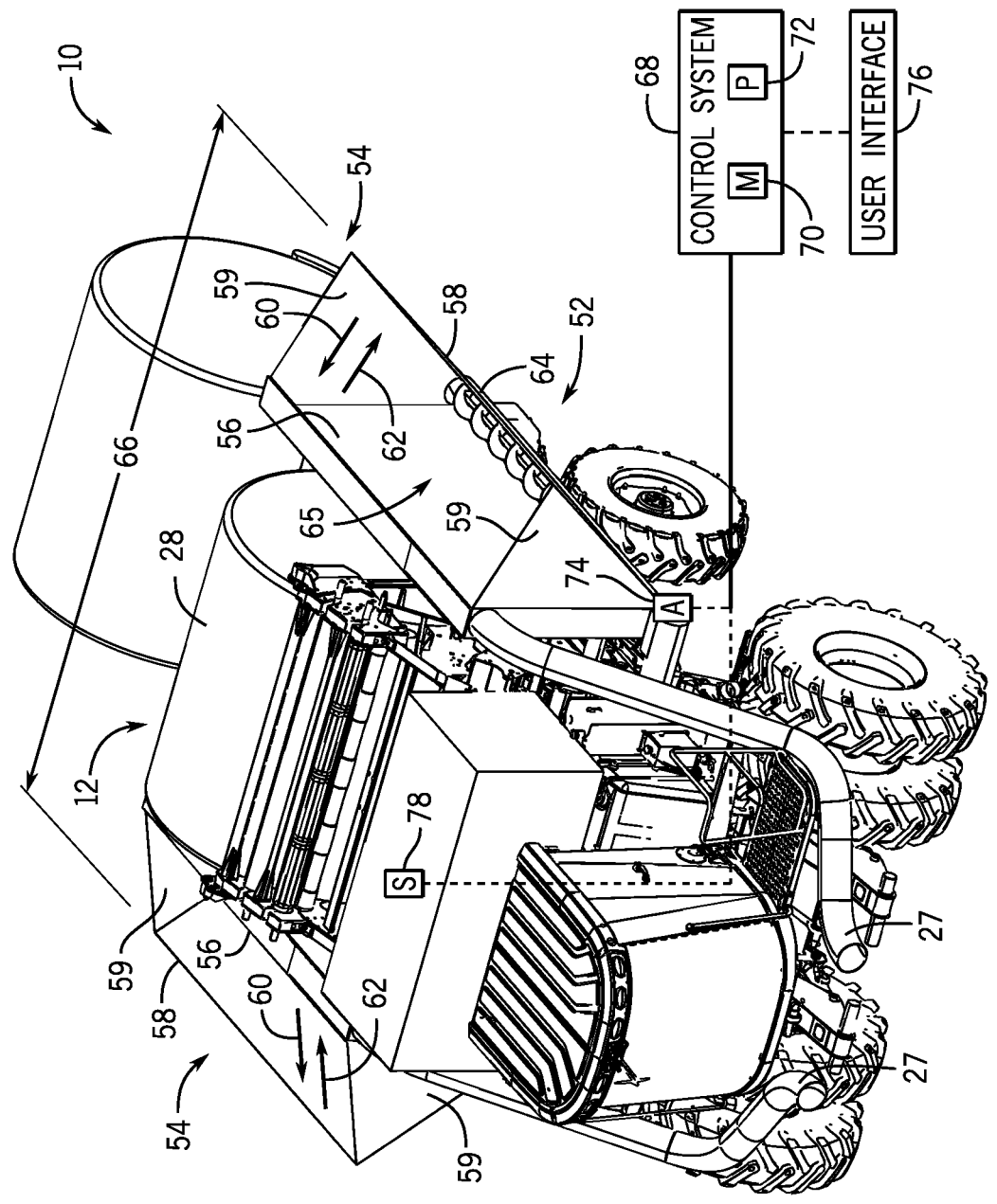
FIG. 2 is a perspective view of an embodiment of an agricultural system having an accumulating system configured to receive collected crop material, in accordance with an aspect of the present disclosure.

FIG. 2 is a perspective view of an embodiment of an agricultural system 10 having an accumulating system 52 configured to receive collected crop material. In the illustrated embodiment, the accumulating system 52 is connected to the conveying system 27, and the conveying system 27 is configured to direct crop material from the crop collector to the accumulating system 52. In some embodiments, the agricultural system 10 may include an air source that provides an airflow, which drives the crop material through tubing of the conveying system 27. The tubing of the conveying system 27 guides the crop material from the crop collector to accumulators 54 of the accumulating system 52, which are coupled to the tubing of the conveying system 27 and configured to store the crop material. Furthermore, the agricultural system 10 includes the agricultural baling system 12, which is configured to receive the crop material from the accumulating system 52 to form the bale 28. During operation of the agricultural system 10, the crop collector may remove crops from the agricultural field, separate crop material from the crops, and direct the crop material to the accumulating system 52 via the conveying system 27. The accumulating system 52 may then direct the crop material to the agricultural baling system 12 to form the bale 28 from the crop material (e.g., in a pass-through mode of the accumulating system 52).

In addition, when the bale 28 is formed and the agricultural baling system 12 is preparing the bale 28 to be deposited onto the agricultural field (e.g., by wrapping the bale 28), the accumulating system 52 may operate in a storage mode to store additional crop material within the accumulators 54. As such, during the storage mode, the additional crop material is not directed to the agricultural baling system 12, thereby enabling the agricultural baling system 12 to prepare the bale 28 for deposition without interference from the additional crop material. Accordingly, the crop collector may continue to harvest crops and to direct the crop material to the accumulating system 52 while the bale 28 is being prepared, thereby increasing an efficiency of the harvesting/baling operation (e.g., as compared to an agricultural system that stops within the field during bale formation). Although the illustrated agricultural system 10 includes two accumulators 54, additional or alternative embodiments of the agricultural system may have any suitable number of accumulators, such as one accumulator, three accumulators, or four or more accumulators. Indeed, there may be several accumulators positioned adjacent to one another (e.g., along the length of the agricultural system) or at any suitable position(s) to receive crop material from the conveying system.

As described in further detail below, each accumulator 54 may be adjustable between an open position and a closed position. For instance, each accumulator 54 may include a stationary wall 56 coupled to a mobile wall 58, and side walls 59 coupled to both the stationary wall 56 and the mobile wall 58. The position of each stationary wall 56 may be substantially fixed relative to a chassis of the agricultural system 10, and each mobile wall 58 is configured to move relative to the stationary wall 56, such as in an inward direction 60 toward a respective stationary wall 56 and in an outward direction 62 away from the respective stationary wall 56. In some embodiments, the mobile walls 58 are pivotably coupled to the respective stationary walls 56 (e.g., at respective hinges 64), and the side walls 59 may be structured to enable the mobile wall 58 to move relative to the stationary wall 56. In this way, each mobile wall 58 may rotate about the respective hinge 64 to move between the open position and the closed position. By way of example, in the open position shown in FIG. 2, the accumulators 54 may receive crop material from the conveying system 27 (e.g., during operation of the agricultural system 10), and the respective walls 56, 58, 59 form a chamber 65 that holds the crop material within the accumulators 54. In the closed position, the mobile walls 58 may be positioned proximate to (e.g., abutting against) the stationary walls 56 to reduce a width 66 of the agricultural system 10 (e.g., for transportation of the agricultural system 10).

In some embodiments, the accumulating system 52 may be controllable via a control system 68. The control system 68 includes a memory 70 and a processor 72, such as a microprocessor. The memory 70 may be a mass storage device, a flash memory device, removable memory, or any other non-transitory computer-readable medium that contains instructions regarding control of the accumulating system 52. The memory 70 may also include volatile memory such as randomly accessible memory (RAM) and/or non-volatile memory such as hard disc memory, flash memory, and/or other suitable memory formats. The processor 72 may be configured to execute the instructions stored in the memory 70 to control the accumulating system 52. For instance, each accumulator 54 may include an actuator 74, such as a hydraulic actuator, an electromechanical actuator, a pneumatic actuator, another suitable type of actuator, or any combination thereof, configured to control the position of the mobile wall 58 relative to the stationary wall 56. The control system 68 may be communicatively coupled to the actuators 74 and may output a control signal to each actuator 74 to control a position of the respective mobile wall 58 relative to the respective stationary wall 56. For instance, the actuator 74 may include a rotary actuator that, upon activation, drives the mobile wall 58 to rotate about the hinge 64, thereby moving the mobile wall 58 relative to the stationary wall 56. Although the present disclosure primarily discusses rotation of the mobile walls 58 relative to the stationary walls 56, at least one mobile wall may additionally or alternatively translate (e.g., linearly) relative to the respective stationary wall(s) to move between the open position and the closed position. In such a configuration, the respective actuator(s) may additionally or alternatively include linear actuator(s) configured to cause translational movement of the respective mobile wall(s) relative to the respective stationary wall(s).

In certain embodiments, the control system 68 may include or be communicatively coupled to a user interface 76, which may include features with which a user (e.g., the operator of the agricultural system 10) may interact. For example, the user interface 76 may include a button, a switch, a trackpad, a touchscreen, a slider, another suitable control, or a combination thereof, that the user may utilize to cause the control system 68 to adjust the position of the accumulators 54. For example, the user may interact with the user interface 76 to cause the user interface 76 to output a signal to the control system 68, and the control system 68, in turn, may output a signal to the actuators 74 to control the position of the accumulators 54. In this way, the user may manually cause the control system 68 to adjust the position of the accumulators 54. The control system 68 may additionally or alternatively determine various operating parameters associated with the agricultural system 10 (e.g., based on data received from a sensor 78). For instance, the operating parameters may include an operating mode of the agricultural system 10, a status of a component of the agricultural system 10, a time of operation of the agricultural system 10, another suitable operating parameter, or any combination thereof. In certain embodiments, the control system 68 may automatically adjust the position of the accumulating system 52 without user input (e.g., based on the determined operating parameter[s], based on feedback from the sensor 78, etc.). As an example, if the control system 68 determines the agricultural system 10 is operating in a transportation mode in which the agricultural system 10 is not harvesting crop material, the control system 68 may set the accumulators 54 in the closed position.

Furthermore, the control system 68 may be configured to operate the accumulating system 52 in either the pass-through mode or the storage mode. In some embodiments, the control system 68 may determine the current operation of the agricultural baling system 12 to determine the corresponding operation of the accumulating system 52. If the control system 68 determines the agricultural baling system 12 is in the process of forming the bale 28, the control system 68 may instruct the accumulating system 52 to operate in the pass-through mode to direct crop material to the agricultural baling system 12. However, if the control system 68 determines the agricultural baling system 12 is not forming the bale 28 (e.g., the agricultural baling system 12 is preparing the bale 28 to be deposited), the control system 68 may instruct the accumulating system 52 to operate in the storage mode. Additionally or alternatively, the control system 68 may operate the accumulating system 52 based on a user input, which may be indicative of a request to operate the accumulating system 52 in either the pass-through mode or the storage mode.

Figure 3:
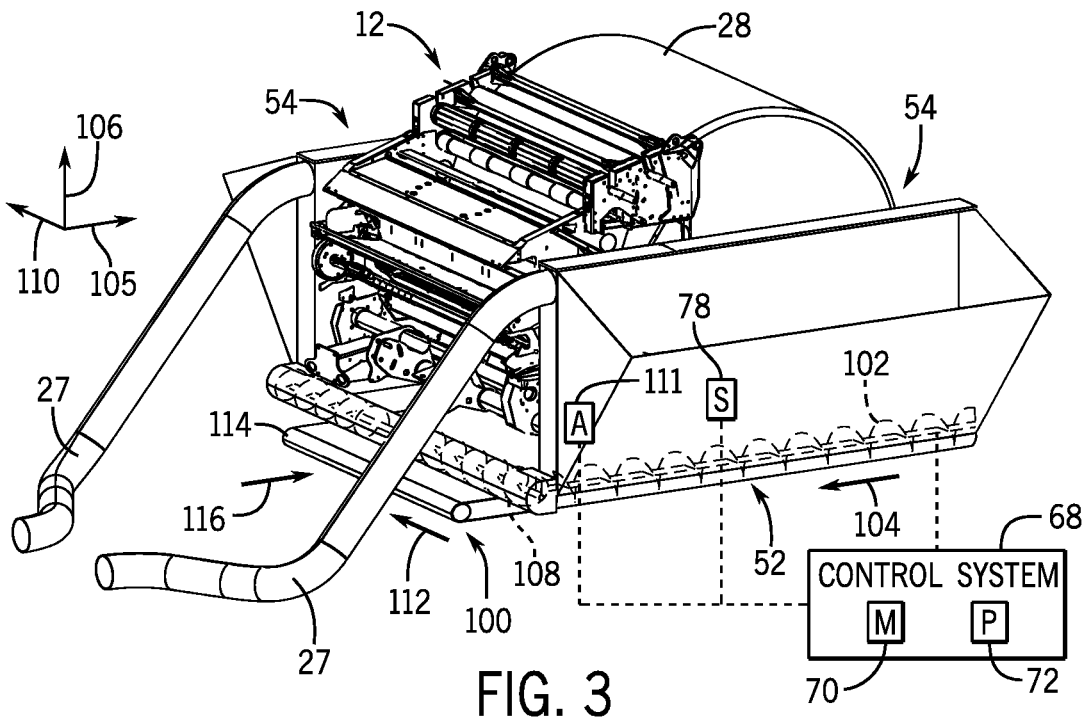
FIG. 3 is a perspective view of an embodiment of an agricultural baling system and an accumulating system that may each be employed within the agricultural system of FIG. 2, in accordance with an aspect of the present disclosure.

FIG. 3 is a perspective view of an embodiment of the agricultural baling system 12 and the accumulating system 52 that may each be employed within the agricultural system of FIG. 2. As illustrated, a tubing of the conveying system 27 is coupled to a top of each accumulator 54. Furthermore, the accumulating system 52 includes a transporting system 100 configured to move crop material from each accumulator 54 to the agricultural baling system 12. In the illustrated embodiment, the transporting system 100 includes a first feeder 102 (e.g., a first auger) disposed within each accumulator 54 near a bottom of the accumulator 54. A tube of the conveying system 27 is coupled to the respective accumulator 54 at a point above the first feeder 102 along a vertical axis 106, and a gravitational force may direct the crop material supplied by the conveying system 27 toward the first feeder 102. During a bale forming operation of the agricultural baling system 12 (e.g., a baling mode of the agricultural baling system 12), the first feeder 102 may rotate to transport crop material in a first direction 104 (e.g., generally along a longitudinal axis 105) toward a second feeder 108 (e.g., a second auger) of the transporting system 100. The second feeder extends along a lateral axis 110 between the accumulators 54.

In the illustrated embodiment, the control system 68 is communicatively coupled to an actuating system 111 that is configured to activate the feeders 102, 108. In some embodiments, the actuating system 111 includes individual actuators configured to operate the feeders 102, 108 independently from one another. In additional or alternative embodiments, the actuating system may include a linkage system that enables the feeders to operate together such that movement of the first feeder also causes movement of the second feeder. In any case, the control system 68 may output a signal to the actuating system 111 to cause the first feeders 102 and the second feeder 108 to rotate while the agricultural baling system 12 is performing the bale forming operation. Activation of the second feeder 108 may cause the crop material to move in a second direction 112 (e.g., generally along the lateral axis 110) to a third feeder 114 of the transporting system 100. The actuating system 111 may also enable the third feeder 114 to activate, thereby directing the crop material in a third direction 116 (e.g., opposite the first direction 104) toward the agricultural baling system 12, which forms the bale 28 from the crop material received from the accumulators 54. In additional or alternative embodiments, the feeders may be manually operated the direct the crop material from the accumulators to the agricultural baling system, such as by the operator of the agricultural system.

While the agricultural baling system 12 is preparing a formed bale 28 for deposition onto the agricultural field (e.g., a depositing mode of the agricultural baling system 12), the accumulating system 52 operates in the storage mode, and the control system 68 may not output the signal to the actuating system 111. Therefore, the feeders 102, 108, 114 may not rotate. Accordingly, the crop material within the accumulators 54 is not directed toward the second feeder 108 and the third feeder 114. As such, the crop material remains stored within the accumulators 54, and the accumulating system 52 operates in the storage mode. Moreover, the conveying system 27 may continue to direct crop material into the accumulators 54 such that the amount of crop material increases within the accumulators 54, but the crop material within the accumulators 54 is not directed to the agricultural baling system 12. After the bale 28 has been prepared and deposited onto the agricultural field, the control system 68 may operate the feeders 102, 108, 114 to direct crop material to the agricultural baling system 12 to form an additional bale. Accordingly, after the bale 28 has been deposited, the control system 68 outputs the signal to the feeders 102, 108, 114 to cause the feeders 102, 108, 114 to rotate, thereby transporting crop material toward the agricultural baling system 12 and transitioning the accumulating system 52 from the storage mode to the pass-through mode. In some embodiments, when the accumulating system 52 transitions from the storage mode to the pass-through mode, the accumulating system 52 may initially operate the feeders 102, 108, 114 at a higher speed to remove crop material from the accumulators 54 at an elevated rate in order to clear out the crop material from the accumulators 54 collected during the storage mode. After the crop material has been substantially removed from the accumulators 54 (e.g., as determined via the sensor 78), the feeders 102, 108, 114 may be operated at a lower, suitable speed to continue to direct the crop material from the accumulators 54 to the agricultural baling system 12 at a sufficient rate.

Although the first and second feeders 102, 108 include augers, and the third feeder 114 includes a conveyor belt in the illustrated embodiment, in other embodiments, any other and/or additional suitable features and/or components may be used to transport crop material from the accumulators to the agricultural baling system. For instance, a pneumatic conveying system (e.g., including an air source), a roller, another suitable feature, or any combination thereof, may be used (e.g., alone or in combination with an auger and/or conveyor belt). Alternative or additional features and/or components may also be used for transporting crop material from the accumulators to the agricultural baling system. By way of example, the agricultural system may include a feature to facilitate transitioning of the crop material from the first feeder to the second feeder, such as an accelerator, a guide rail, an air source, another suitable feature, or any combination thereof, configured to redirect the movement of the crop material from the first feeder to the second feeder. Moreover, the feeders 102, 108, 114 may be operated to distribute the crop material (e.g., in a substantially even distribution) along the lateral axis 110 prior to transportation to the agricultural baling system 12, thereby increasing an efficiency of the agricultural baling system 12. For instance, the third feeder 114 may intermittently pause operation to enable the second feeder 108 to distribute the crop material along the lateral axis 110 before the crop material is directed to the agricultural baling system 12. Additionally or alternatively, the agricultural system may include additional features or components that operate to distribute the crop material along the lateral axis.

Figure 4:
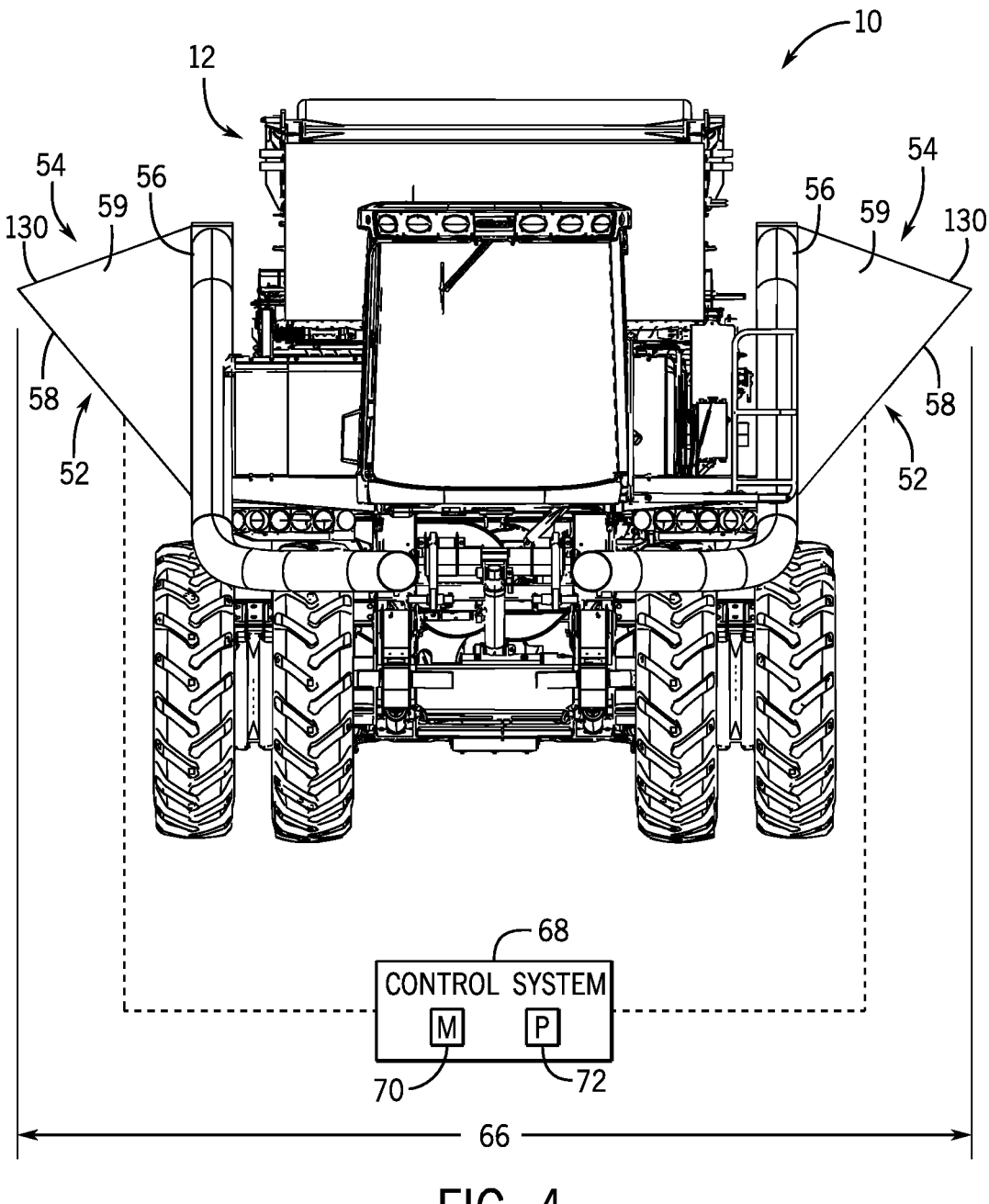
FIG. 4 is a front view of the agricultural system of FIG. 2, in which accumulators of the accumulating system are in an open position, in accordance with an aspect of the present disclosure.

FIG. 4 is a front view of the agricultural system 10 of FIG. 2, in which the accumulators 54 of the accumulating system 52 are in the open position, such as when the accumulating system 52 are active (e.g., operating in either the pass-through mode or the storage mode). For example, the agricultural system 10 may be actively operating to harvest crop material. As shown in the illustrated embodiment, in the open position, the stationary wall 56, the mobile wall 58, and the side walls 59 of each accumulator 54 form a triangular shape. In particular, the side walls 59 are in an extended position, and an edge 130 of the mobile wall 58 is positioned away from the respective stationary wall 56. In embodiments in which the mobile wall additionally or alternatively translates relative to the respective stationary wall, the stationary wall, the mobile wall, and the side walls may form a different shape in the open position of the accumulator, such as a rectangular or square shape. In any case, the width 66 of the agricultural system 10 when the accumulators 54 are in the open position may be an increased lateral width.

Figure 5:
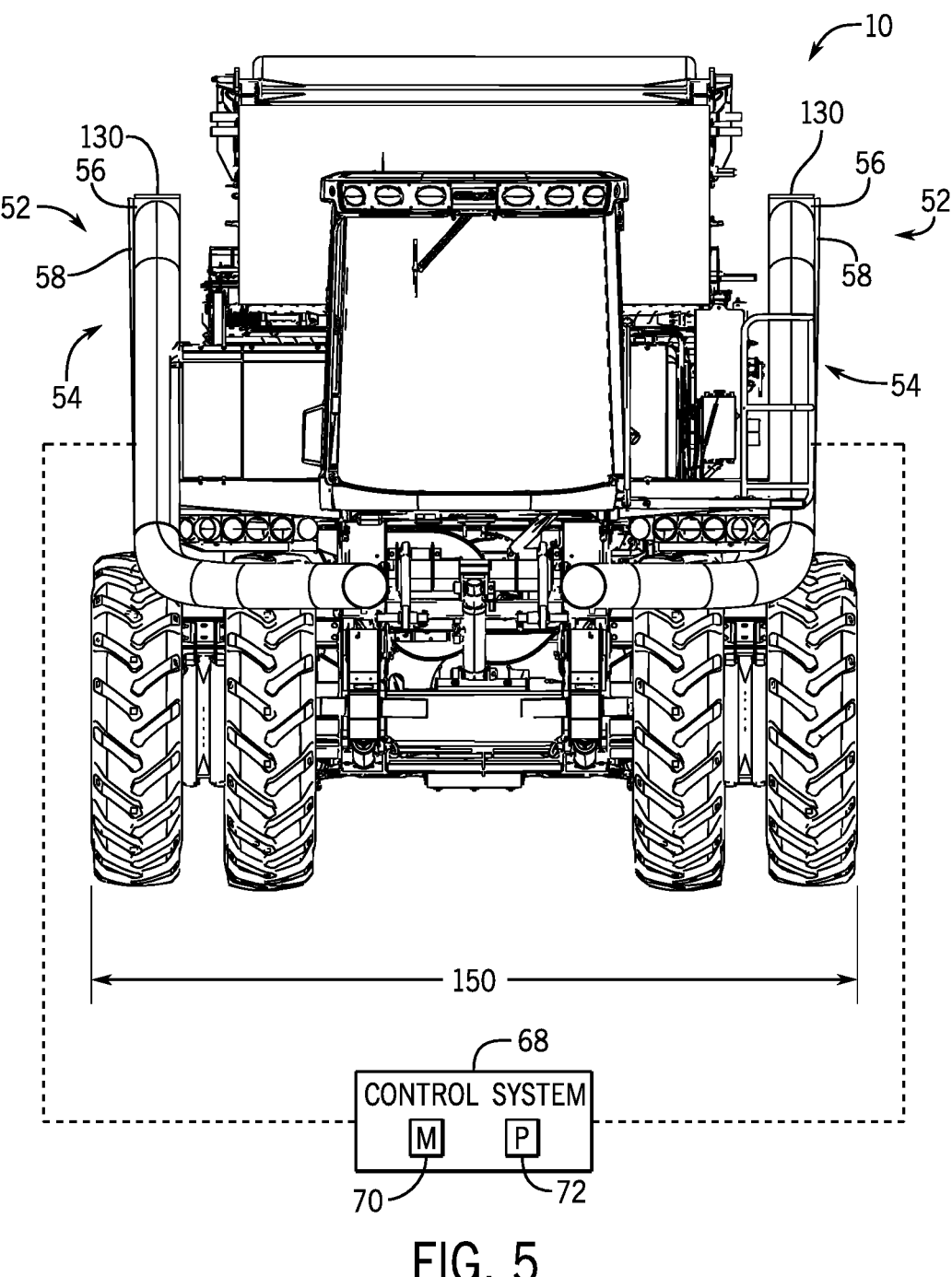
FIG. 5 is a front view of the agricultural system of FIGS. 2 and 4, in which the accumulators are in a closed position, in accordance with an aspect of the present disclosure.

FIG. 5 is a front view of the agricultural system 10 of FIGS. 2 and 4, in which the accumulators 54 are in the closed position. For instance, the agricultural system 10 may be in a transportation mode so as to drive along a path without harvesting crop material. In the closed position, the side walls 59 may be in a retracted position such that the edge 130 of each mobile walls 58 is positioned adjacent to the stationary walls 56. As a result, the mobile wall 58 may generally extend along the respective stationary walls 56 such that the accumulator 54 is compressed. With the accumulators in the closed position, the agricultural system 10 has a second lateral width 150 (e.g., a reduced lateral width). To enable movement of each mobile wall 58, the side walls 59 may include an adjustable structure, such as a bellows, a telescoping configuration, a flexible (e.g., mesh) material, another suitable structure, or any combination thereof. Therefore, the side walls 59 may expand and retract accordingly (e.g., based on movement of the respective mobile wall 58).

As shown in the illustrated embodiment, the accumulators 54 are positioned at lateral sides of the agricultural system 10, such as laterally outward from the agricultural baling system 12. Accordingly, the accumulating system 52 does not increase a height or longitudinal length of the agricultural system 10. Moreover, although FIG. 4 illustrates each accumulator 54 in the open position, and FIG. 5 illustrates each accumulator 54 in the closed position, it should be noted that in some cases, one of the accumulators may be in the open position and the other accumulator may be in the closed position. For instance, the control system may be configured to move each accumulator independently of one another. Further still, the control system may also be configured to move each accumulator to a position in-between the open position and the closed position. By way of example, it may be desirable for one of the accumulators to be partially open to avoid contact with an obstacle (e.g., a tree), while still enabling the accumulator to receive and/or store crop material.

Figure 6:
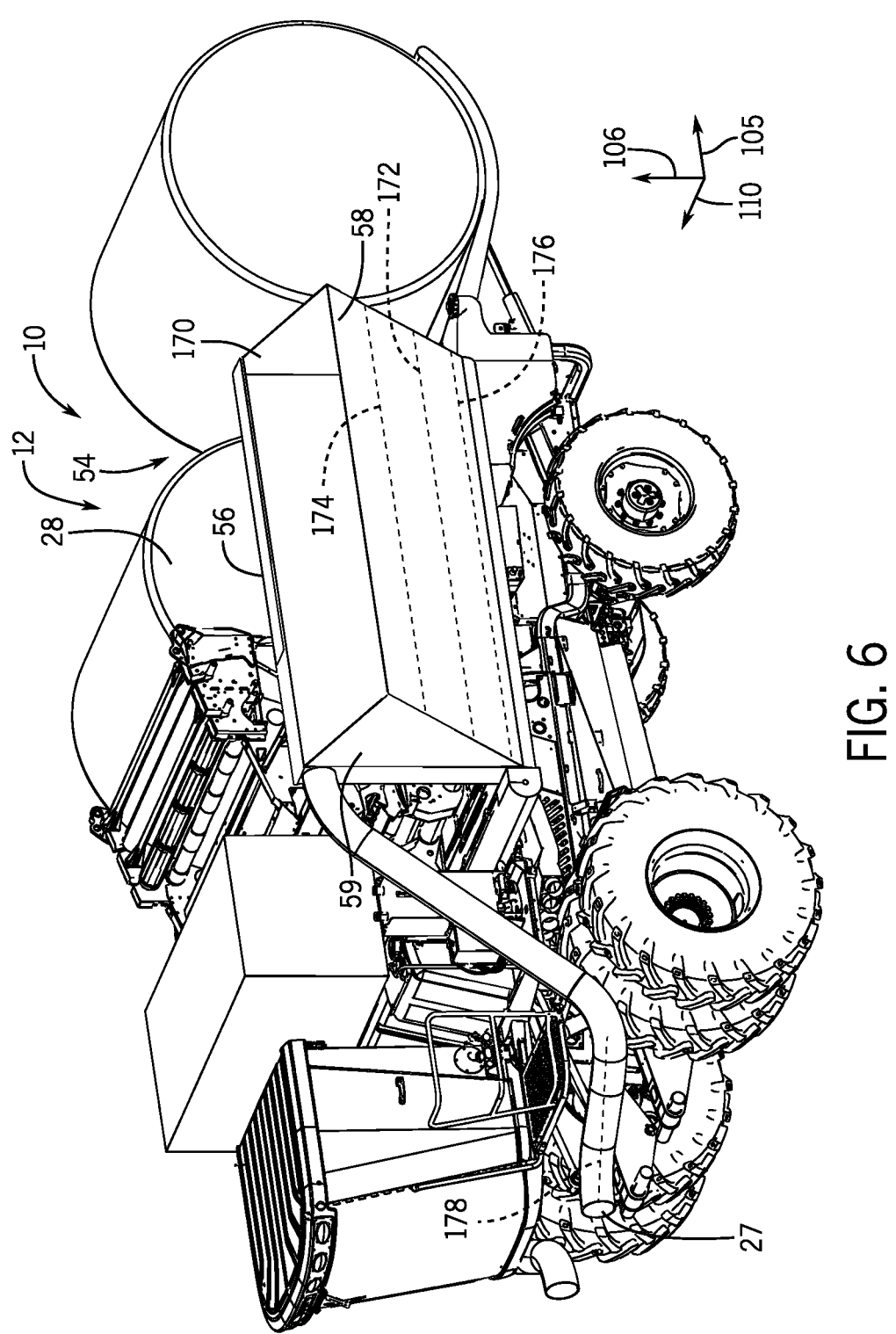
FIG. 6 is a side perspective view of the agricultural system of FIGS. 2, 4, and 5, in accordance with an aspect of the present disclosure.

FIG. 6 is a side perspective view of the agricultural system 10 of FIGS. 2, 4, and 5. In the illustrated embodiment, the accumulator 54 of the agricultural system 10 includes a cover 170 extending between the stationary wall 56, the mobile wall 58, and the side walls 59. The cover 170 may enclose crop material within the accumulator 54 and block crop material from moving out of the accumulator 54. The cover 170 may be adjustable between an expanded position (e.g., in the open position of the accumulator 54) and a retracted position (e.g., in the closed position of the accumulator 54). In some embodiments, the cover 170 may include openings to enable air to discharge from the accumulator. In an example, the cover 170 may include a flexible material similar to that of the side walls 59. Thus, the cover 170 may also be easily deformable to adjust between the expanded position and the retracted position. In additional or alternative embodiments, the cover may include multiple rods that each extend across the accumulator (e.g., along the longitudinal axis 105 to connect the side walls). In such embodiments, the rods may move away from one another as the accumulator transitions toward the open position to enable the cover to expand, and the rods may stack as the accumulator transitions toward the closed position to enable the cover to retract. Although the illustrated cover 170 is used in one of the accumulators 54, any of the accumulators may have the cover. In further embodiments, any of the accumulators may not have a cover but rather, the accumulators may be open or uncovered.

The agricultural system 10 may further include a cleaning system that blocks debris from collecting within the accumulators 54. In an example, the cleaning system may include nozzles 172 disposed within the accumulators 54. Fluid, such as air, may be forced through the nozzles 172 (e.g., in an upward direction along the horizontal axis 106) to move the crop material along with dust and debris toward the cover 170. The cover 170 may block the crop material from flowing out of the accumulator 54, but may enable the dust and debris to be directed out of the accumulator 54, thereby removing the dust and debris from within the accumulator 54. In another example, the cleaning system may include an agitator 174 disposed within the accumulator 54. The agitator 174 may be an auger or another suitable component that causes movement of the crop material to separate the crop material from dust and debris. In the illustrated embodiment, the agitator 174 is positioned adjacent to the cover 170 such that movement of the crop material may eject the dust and debris through the cover 170 and out of the accumulator 54. Additionally or alternatively, the accumulator 54 may include openings 176, such as grates, positioned near a bottom of the accumulator 54, and the openings 176 may enable dust and debris to be removed from the accumulator 54 (e.g., via a gravitational force), but may block the crop material from being moved out of the accumulator 54. The conveying system 27 may similarly include openings 178 to enable dust and debris to be removed from crop material gathered via the crop collector before the crop material is directed into the accumulators 54. In any case, the cleaning system blocks unwanted material from being transported to the agricultural baling system 12, thereby improving the formation of the bale 28.

Figure 7:
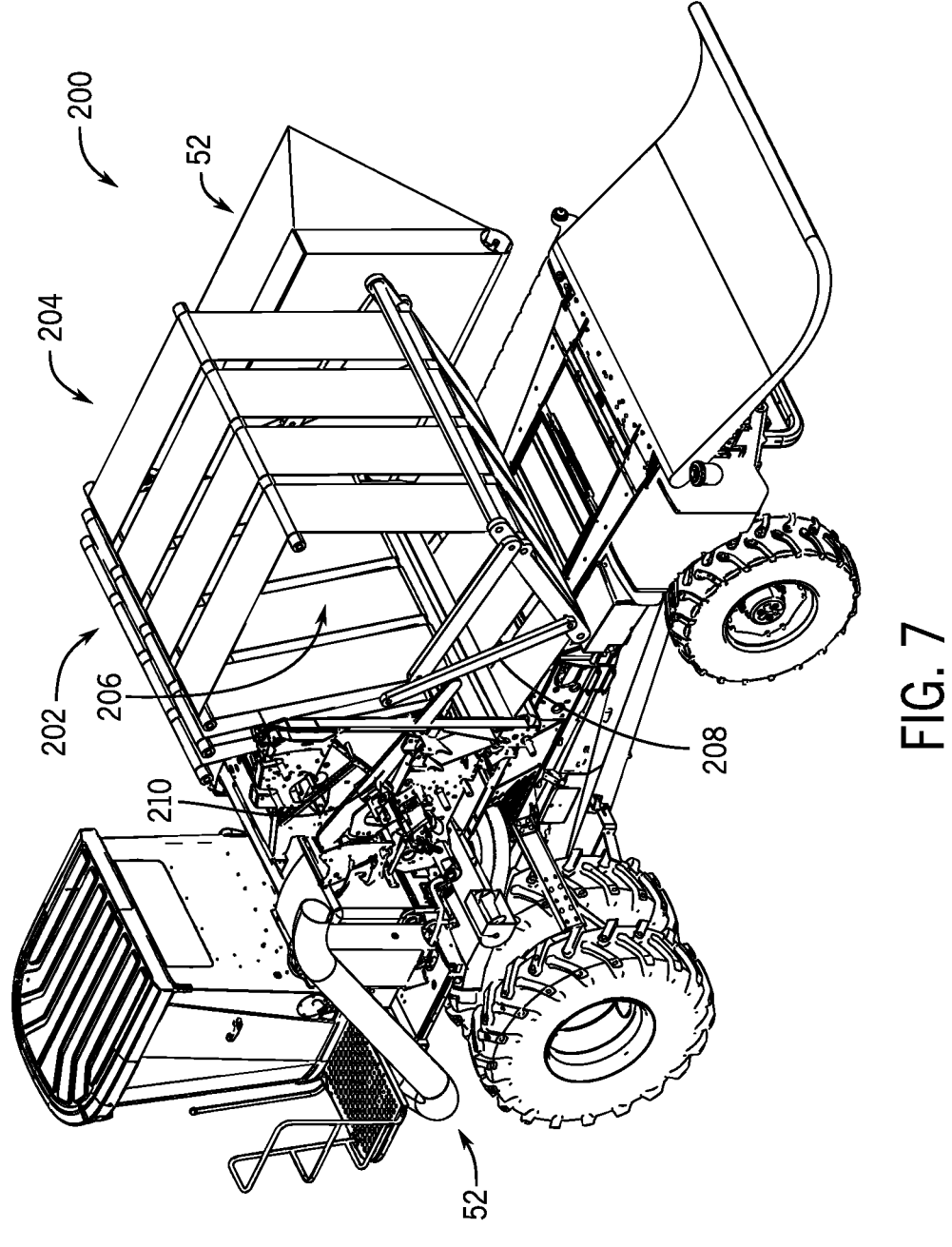
FIG. 7 is a rear perspective view of an embodiment of an agricultural system that includes an accumulating system and an agricultural baling system, in accordance with an aspect of the present disclosure.

FIG. 7 is a rear perspective view of an embodiment of an agricultural system 200 that includes the accumulating system 52 and an agricultural baling system 202. The agricultural baling system 202 includes a flexible belt system 204 that may rotate to form crop material into a bale. In the illustrated embodiment, the agricultural baling system 202 is a round baler, in which the flexible belt system 204 may form the crop material into a round bale. The flexible belt system 204 establishes a space 206 in which the bale is formed. A belt 208 of the flexible belt system 204 may be configured to receive crop material from the accumulating system 52. For example, the belt 208 may be positioned adjacent to the third feeder such that the third feeder directs the crop material to the belt 208. The belt 208 may then rotate to collect the crop material within the space 206 and to compact the crop material within the space 206 to form the bale of crop material. For instance, the agricultural baling system 202 includes an arm 210 that is coupled to the flexible belt system 204 and may be movable to enable the belt 208 to expand within the space 206 to accommodate additionally received crop material, which increases the size of the bale.

Figure 8:
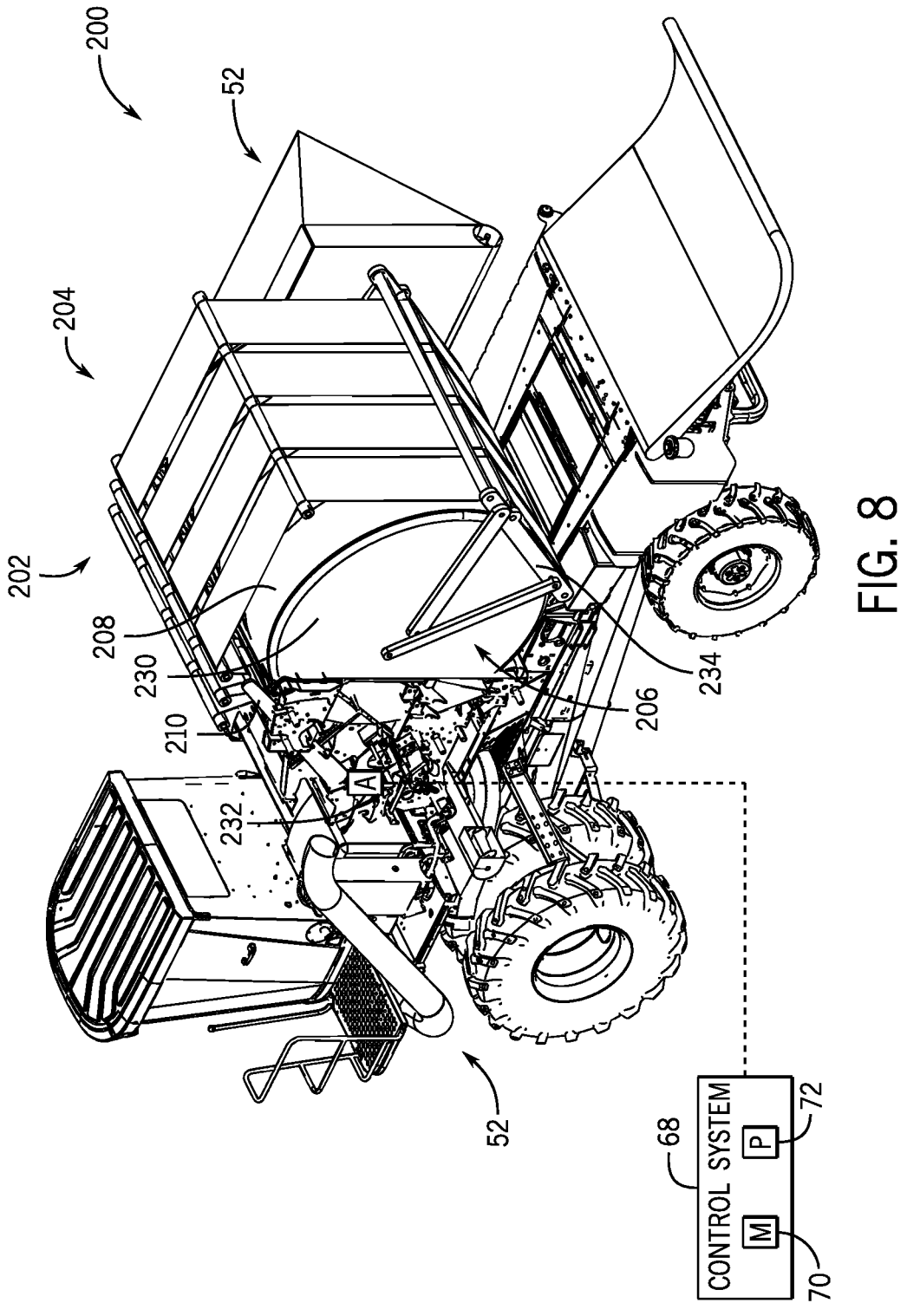
FIG. 8 is a rear perspective view of the agricultural system of FIG. 7 having a partially formed bale within the agricultural baling system, in accordance with an aspect of the present disclosure.

FIG. 8 is a rear perspective view of the agricultural system 200 of FIG. 7 having a partially formed bale 230 within the agricultural baling system 202. The space 206 formed by the flexible belt system 204 encloses the bale 230, and the arm 210 is raised to enable the belt 208 to expand to accommodate the size of the bale 230. As an example, the control system 68 is communicatively coupled to an actuator 232 configured to drive the arm 210 to move based on the size of the bale 230 (e.g., based on the force exerted by the bale 230 onto the belt 208). Furthermore, the agricultural baling system 202 includes a gate assembly 234 configured to hold the bale 230 within the space 206. For example, the gate assembly 234 may cause a portion of the flexible belt system 204 to maintain contact with the bale 230 and block movement of the bale 230 out of the space 206. Thus, the bale 230 remains within the space 206 until the bale 230 is ready to be deposited onto the agricultural field.

Figure 9:
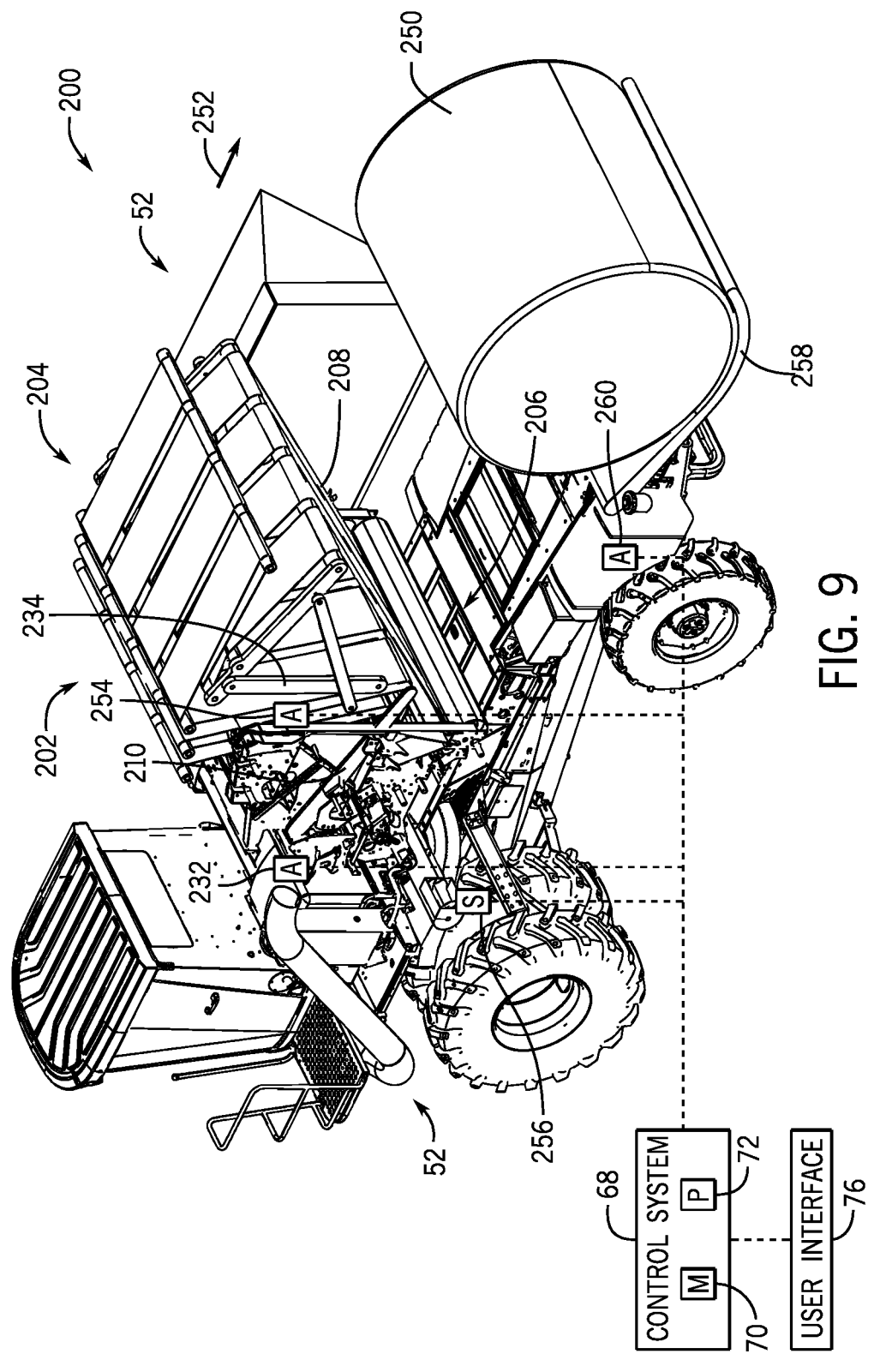
FIG. 9 is a rear perspective view of the agricultural system of FIGS. 7 and 8 in the process of depositing a fully formed bale onto an agricultural field, in accordance with an aspect of the present disclosure.

FIG. 9 is a rear perspective view of the agricultural system 200 of FIGS. 7 and 8 in the process of depositing a fully formed bale 250 onto the agricultural field. As illustrated in FIG. 9, the gate assembly 234 is in a raised position to enable the bale 250 to move out of the space 206. For instance, while the gate assembly 234 is in the raised position, the belt 208 may remain in contact with the bale 250, but the raised gate assembly 234 may move the flexible belt system 204 such that a remaining portion of the flexible belt system 204 no longer contacts the bale 250. As such, the flexible belt system 204 does not block movement of the bale 250 out of the space 206. Furthermore, the control system 68 may control the actuator 232 to lower the arm 210, thereby reducing a length of the belt 208. Reducing the length of the belt 208 may cause the belt 208 to exert a force onto the bale 250 to drive the bale 250 in a rearward direction 252 out of the space 206. By way of example, in the illustrated embodiment, the control system 68 is communicatively coupled to an actuator 254 configured to move (e.g., rotate) the gate assembly 234 to enable or block movement of the bale 250 out of the space 206.

In some embodiments, the control system 68 may automatically instruct movement of the gate assembly 234 and/or the arm 210 to drive the bale 250 out of the space 206, such as based on data received from a sensor 256 communicatively coupled to the control system 68. As an example, the sensor 256 may include a pressure sensor configured to output a signal indicative of a force or pressure exerted by the bale 250 onto the flexible belt system 204 (e.g., onto the belt 208), an optical sensor configured to output a signal indicative of a size of the bale 250, another suitable sensor, or any combination thereof. The sensor 256 may output sensor data to the control system 68, which determines whether to adjust the arm 210 and/or the gate assembly 234 accordingly (e.g., to move the bale 250 out of the space 206). In additional or alternative embodiments, the control system 68 may instruct movement of the arm 210 and/or the gate assembly 234 based on a user input received from the user interface 76. For example, the operator of the agricultural system 200 may interact with the user interface 76 to cause the arm 210 and/or the gate assembly 234 to move the bale 250 out of the space 206.

In the illustrated embodiment, the agricultural system 200 also includes a holder 258 that may receive the bale 250 from the space 206. The holder 258 may be shaped to accommodate the geometry of the bale 250, thereby holding the bale 250 while the agricultural system 200 continues to operate and move along the agricultural field. The holder 258 may enable the shape of the bale 250 to be substantially maintained during deposition. For instance, the holder 258 may lower to cause the bale 250 to move from the holder 258 onto the agricultural field (e.g., via a gravitational force) and more gently be deposited as compared to dropping directly from the space 206 to the agricultural field. In certain embodiments, the holder 258 is movable via an actuator 260 communicatively coupled to the control system 68. By way of example, when the agricultural system 200 is at a target position within the agricultural field, the control system 68 may output a signal to the actuator 260 to lower the holder 258, thereby depositing the bale at the target position. In additional or alternative embodiments, the holder may be movable based on a user input (e.g., received from the user interface). In further embodiments, the actuator may be omitted, and the holder may automatically move, such as due to a force imparted onto the holder by the weight of the bale.

Although the agricultural system disclosed above with reference to FIGS. 2-9 is configured to form a bale having a cylindrical shape, in additional or alternative embodiments, an agricultural system having the accumulating system described herein, may be configured to form a bale having any suitable shape. As an example, the accumulating system may direct crop material to an agricultural baling system configured to form a square bale, a rectangular bale, a spherical bale, or any other suitable shape for deposition onto the agricultural field.

Figure 10:
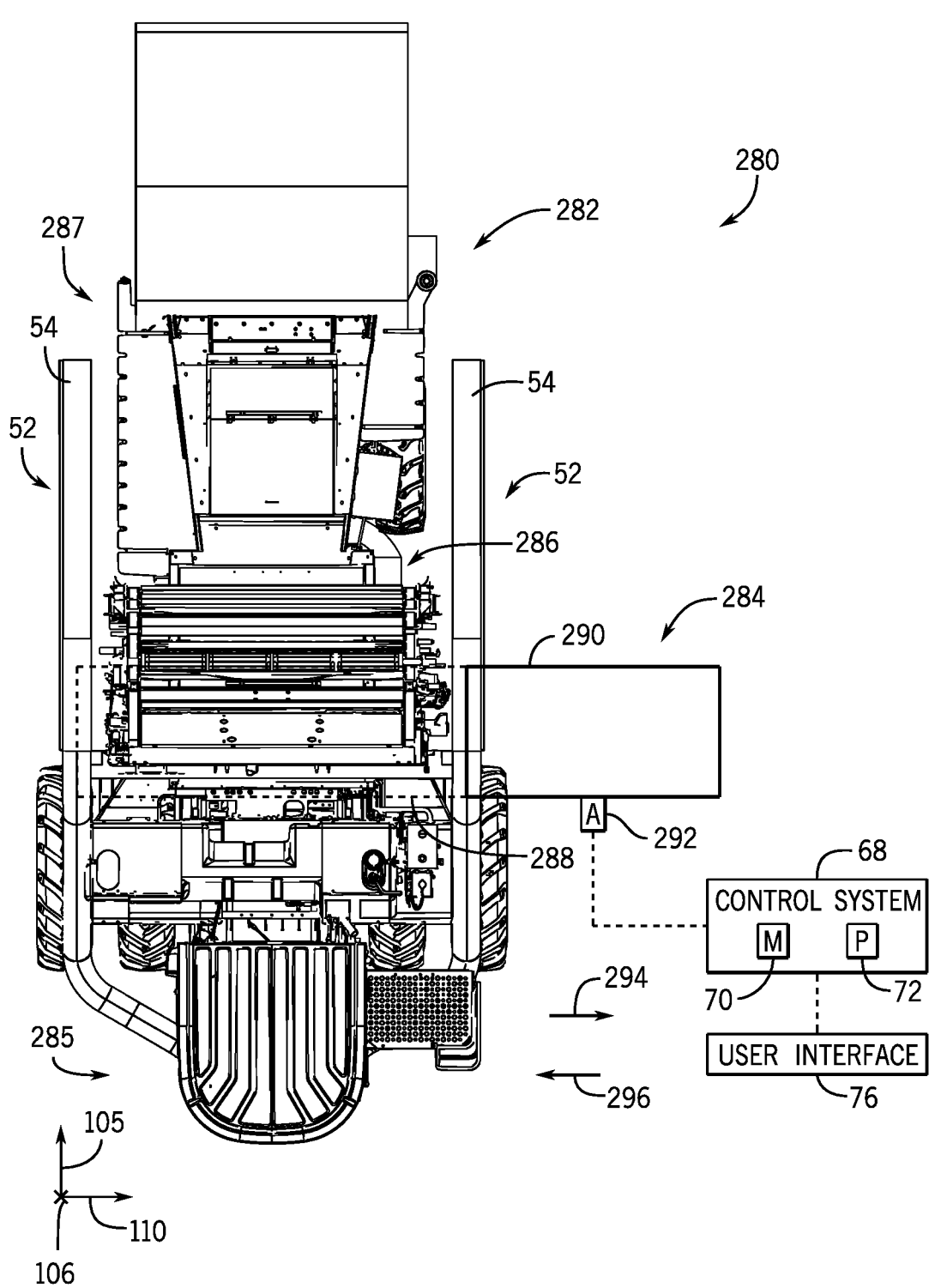
FIG. 10 is a top view of an embodiment of an agricultural system having an accumulating system and an agricultural baling system, in accordance with an aspect of the present disclosure.

FIG. 10 is a top view of an embodiment of an agricultural system 280 having the accumulating system 52 and an agricultural baling system 282. The agricultural baling system 282 includes a wrapping system 284 configured to wrap a bale formed by the agricultural baling system 282 to prepare the bale for deposition onto the agricultural field. The illustrated wrapping system 284 may be configured to move relative to a remainder of the agricultural baling system 282, such as relative to a baling chamber 286 in which the bale is formed. As an example, during operation of the agricultural baling system 282, the wrapping system 284 may be at a first position 288 within the agricultural system 280 to enable the wrapping system 284 to wrap the bale formed by the agricultural baling system 282. The wrapping system 284 may also be configured to move to a second position 290 external to the agricultural system 280. In the second position 290, the wrapping system 284 may be accessible to a user (e.g., an operator, a technician, etc.), such as to enable the user to change or replace wrapping material, to perform maintenance on the wrapping system 284, and the like.

Although the illustrated wrapping system 284 is positioned near a front 285 of the agricultural system 280 (e.g., at a top portion of the agricultural system 280 near the front 285), the wrapping system may be positioned at any suitable part of the agricultural system. For instance, the wrapping system may alternatively be positioned at a rear 287 of the agricultural system, underneath the agricultural system, or any combination thereof. Indeed, the agricultural system may include multiple wrapping systems positioned at various locations of the agricultural system.

In some embodiments, the control system 68 may be configured to instruct movement of the wrapping system 284 between the first position 288 and the second position 290. As an example, the control system 68 is communicatively coupled to an actuator 292 configured to move the wrapping system 284. The actuator 292 may be a linear actuator configured to drive the wrapping system 284 to move in a first lateral direction 294 along the lateral axis 110 from the first position 288 to the second position 290, and to drive the wrapping system 284 to move in a second lateral direction

296, opposite the first lateral direction 294, from the second position 290 to the first position 288. In additional or alternative embodiments, the actuator may cause the wrapping system to move in any suitable manner into and out of a body of the agricultural system, such as in a linear direction along the longitudinal axis 105, in a linear direction along the vertical axis 106 (e.g., to move closer to the agricultural field to facilitate access by a user), in a rotational direction, and so forth. As such, the actuator may be a rotary actuator. In any case, the control system 68 may receive a user input indicative of a request to move the wrapping system 284 into the first position 288 or the second position 290. The control system may additionally or alternatively instruct movement of the wrapping system automatically (i.e., without a user input), such as based on a condition (e.g., an amount of available wrapping material) of the wrapping system, a status of another component of the wrapping system, another suitable parameter, or any combination thereof. In further embodiments, the wrapping system may be manually moved (i.e., without an actuator), such as by the operator of the agricultural system.

It should be noted that the movement of the wrapping system 284 does not interfere with a placement or position of the accumulating system 52. That is, for example, the movement of the wrapping system 284 in the first lateral direction 294 and in the second lateral direction 296 does not cause the wrapping system 284 to come into contact with the accumulators 54. Moreover, movement of the wrapping system 284 does not affect the operation of the accumulating system 52. For this reason, the accumulators 54 may receive crop material and/or the accumulating system 52 may direct crop material to the agricultural baling system 282 regardless of the position of the wrapping system 284.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural system, comprising:
   a baling system configured to form a bale of crop material within a baling chamber of the baling system; and
   an accumulator positioned laterally outward from the baling chamber, wherein the accumulator overlaps the baling chamber with respect to a longitudinal axis of the agricultural system, the accumulator is adjustable between an open position and a closed position, and the baling system is configured to receive the crop material from the accumulator.

2. The agricultural system of claim 1, wherein the accumulator comprises a stationary wall and a mobile wall, and the mobile wall is movable relative to the stationary wall.

3. The agricultural system of claim 2, wherein the mobile wall is rotatably coupled to the stationary wall via a hinge, and the mobile wall is configured to rotate about the hinge to adjust the accumulator between the open position and the closed position.

4. The agricultural system of claim 2, wherein the accumulator comprises a side wall extending between and coupled to the stationary wall and to the mobile wall, the side wall is configured to be in an extended position while the accumulator is in the open position, and the side wall is configured to be in a retracted position while the accumulator is in the closed position.

5. The agricultural system of claim 4, wherein the accumulator comprises a cover extending between the stationary wall, the mobile wall, and the side wall, the cover is configured to be in an expanded position while the accumulator is in the open position, and the cover is configured to be in a retracted position while the accumulator is in the closed position.

6. The agricultural system of claim 1, wherein the agricultural system comprises a first width when the accumulator is in the open position, the agricultural system comprises a second width when the accumulator is in the closed position, and the first width is greater than the second width.

7. The agricultural system of claim 1, wherein an entirety of the accumulator is positioned laterally outward from the baling system.

8. An agricultural system, comprising:
   a baling system configured to form a bale of crop material within a baling chamber of the baling system; and
   an accumulating system comprising an accumulator and a transporting system, wherein the accumulator is positioned laterally outward from the baling chamber, the accumulator overlaps the baling chamber with respect to a longitudinal axis of the agricultural system, the accumulator is adjustable between an open position and a closed position, and the transporting system is configured to direct the crop material from the accumulator to the baling system while the accumulator is in the open position.

9. The agricultural system of claim 8, wherein the accumulating system is configured to operate in a pass-through mode or a storage mode while the accumulator is in the open position, the transporting system is configured to direct the crop material from the accumulator to the baling system during the pass-through mode, and the transporting system is configured to not direct the crop material from the accumulator to the baling system during the storage mode.

10. The agricultural system of claim 8, wherein the transporting system comprises a first feeder and a second feeder, and the first feeder is disposed in the accumulator and is configured to direct the crop material within the accumulator toward the second feeder.

11. The agricultural system of claim 10, wherein the transporting system comprises a third feeder, the second feeder is configured to direct the crop material toward the third feeder, and the third feeder is configured to direct the crop material toward the baling system.

12. The agricultural system of claim 11, wherein the first feeder comprises an auger, the second feeder comprises an auger, and the third feeder comprises a conveyor belt.

13. The agricultural system of claim 11, wherein the baling system comprises a flexible belt system configured to receive the crop material from the third feeder, and the flexible belt system is configured to rotate to form the bale of the crop material.

14. The agricultural system of claim 10, comprising a control system, wherein the control system is configured to output a signal to cause the first feeder to operate while the baling system is operating in a baling mode, and the control system is configured to not output the signal while the baling system is operating in a depositing mode.

15. The agricultural system of claim 10, comprising a conveying system configured to direct the crop material from a crop collector of the agricultural system to the accumulating system.

16. The agricultural system of claim 8, wherein an entirety of the accumulator is positioned laterally outward from the baling system.

17. An agricultural system, comprising:

a baling system configured to form a bale of crop material within a baling chamber of the baling system;

a first accumulator positioned laterally outward from the baling chamber, wherein the first accumulator overlaps the baling chamber with respect to a longitudinal axis of the agricultural system, and the baling system is configured to receive the crop material from the first accumulator; and a control system communicatively coupled to the first accumulator, wherein the control system is configured to output a first signal to cause the first accumulator to move between a first open position and a first closed position.

18. The agricultural system of claim 17, comprising a second accumulator positioned laterally outward from the baling chamber, wherein the control system is communicatively coupled to the second accumulator, and the control system is configured to output a second signal independently of the first signal to cause the second accumulator to move between a second open position and a second closed position.

19. The agricultural system of claim 17, wherein the first accumulator comprises a stationary wall and a mobile wall pivotally coupled to one another, the agricultural system comprises a rotary actuator communicatively coupled to the control system, and the first signal is output to the rotary actuator and is indicative of instructions to rotate the mobile wall relative to the stationary wall to adjust the first accumulator between the first open position and the first closed position.

20. The agricultural system of claim 17, wherein an entirety of the first accumulator is positioned laterally outward from the baling system.

* * * * *